United States Patent [19]

Gremillion

[11] Patent Number: 4,630,593
[45] Date of Patent: Dec. 23, 1986

[54] BARBECUE GRILL WITH FIRE RETARDING SCREEN

[76] Inventor: Ernest J. Gremillion, P.O. Box 556, Larose, La. 70373

[21] Appl. No.: 780,986

[22] Filed: Sep. 27, 1985

[51] Int. Cl.⁴ ........................ A47J 37/07; F24B 13/02
[52] U.S. Cl. .................................. 126/25 R; 126/9 R; 126/41 R
[58] Field of Search ................... 126/9 R, 9 B, 25 R, 126/25 A, 25 AA, 39 K, 41 R, 51; 99/447

[56] References Cited

U.S. PATENT DOCUMENTS

| | | | |
|---|---|---|---|
| 758,472 | 4/1904 | Reams | 126/9 B |
| 2,728,334 | 12/1955 | Paolella | 126/25 R |
| 2,746,378 | 5/1956 | Lang | 126/25 R X |
| 3,167,642 | 1/1965 | Reis | 126/25 R X |

FOREIGN PATENT DOCUMENTS

| | | | |
|---|---|---|---|
| 659147 | 3/1963 | Canada | 126/25 R |
| 2444438 | 8/1980 | France | 126/25 AA |

*Primary Examiner*—Margaret A. Focarino
*Attorney, Agent, or Firm*—Harvey B. Jacobson

[57] ABSTRACT

A barbecue grill combined with a fire retarding screen suspended in vertically spaced relation to a bed of coals and below the cooking grill for barbecuing and smoking meats and vegetables placed on the grill. The fire retarding screen includes metal wire woven to form a mesh with small openings to retard flame passage and provide greater heat intensity for cooking the food at a faster rate with the high heat intensity of the screen causing any grease or fat drippings from the food to be dissipated on contact with the screen thereby eliminating accumulation or build up of flammable grease or fat drippings so that flames caused by such drippings becoming ignited will not burn or char food. This enables the outer edges and surfaces of the food to become crisp while the inner portion remains moist. The fire retarding screen is suspended from the food cooking grill by a plurality of hook-type clips which are movably connected to the screen so that they can be folded against the surface of the screen for ease of storage, packaging and transportation.

4 Claims, 5 Drawing Figures

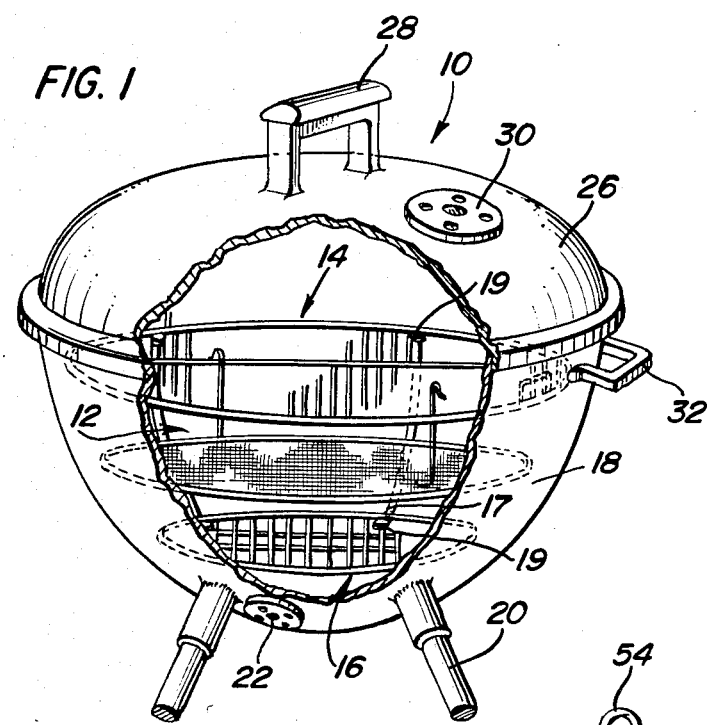
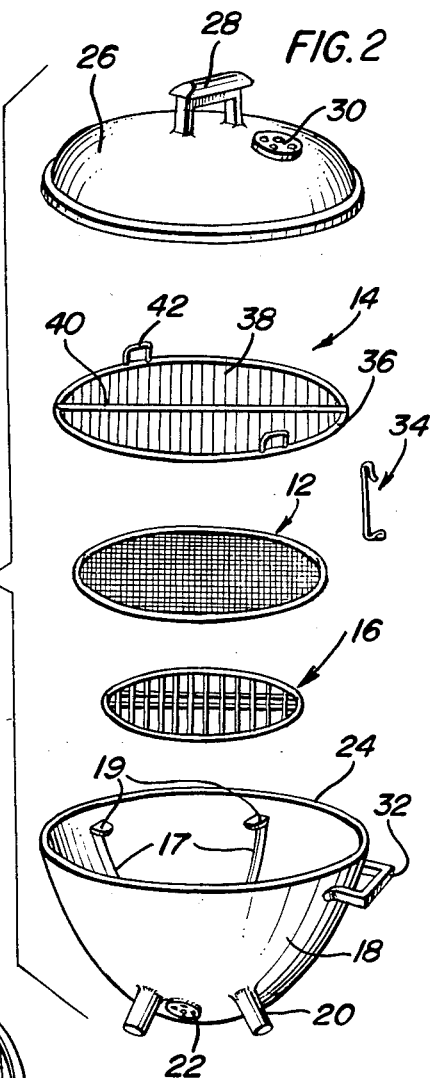
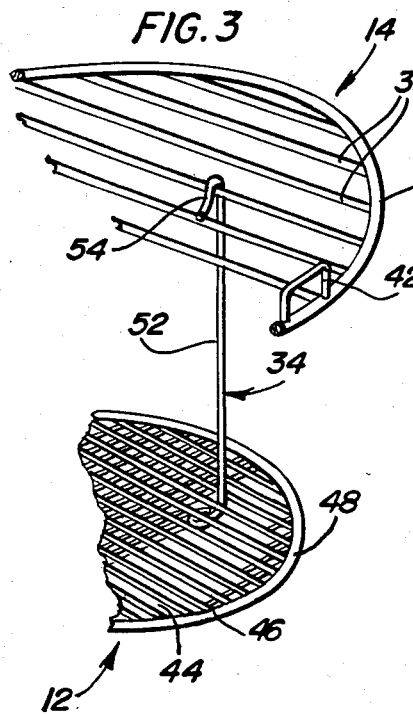
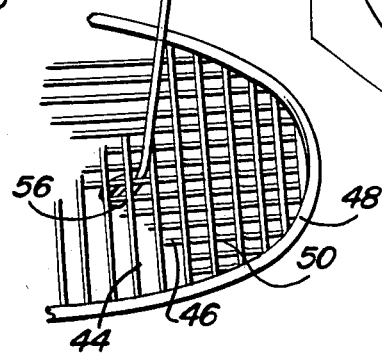
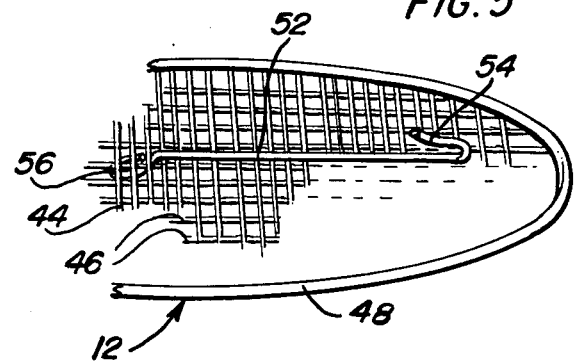

4,630,593

BARBECUE GRILL WITH FIRE RETARDING SCREEN

BACKGROUND OF THE INVENTION

Field of the Invention

The present invention generally relates to a barbecue grill combined with a fire retarding screen suspended in vertically spaced relation to a bed of coals and below the cooking grill for barbecuing and smoking meats and vegetables placed on the grill. The fire retarding screen includes metal wire woven to form a mesh with small openings to provide greater heat intensity for cooking the food at a faster rate with the high heat intensity of the screen causing any grease or fat drippings from the food to be dissipated on contact thereby eliminating accumulation or build up of flammable grease or fat drippings so that flames caused by such drippings becoming ignited will not burn or char the food. This enables the outer edges and surfaces of the food to become crisp while the inner portion remains moist. The fire retarding screen is suspended from the food cooking grill by a plurality of hook-type clips which are connected to the screen so that they can be folded against the surface of the screen for ease of storage, packaging and transportation.

Information Disclosure Statement

Outdoor cooking assemblies of various types have been utilized for many years with such developments including permanently built masonry-type structures with a cooking grill supported therefrom, portable kettles or panlike barbecue grills with a cooking grill supported thereon with the grill sometimes being vertically adjustably supported and/or rotatably supported so that the relationship of the food products positioned on the cooking grill to the bed of coals formed by charcoal briquettes or the like can be adjusted to obtain optimum results. While such devices have been widely accepted and have been extensively used, one problem which has continued to exist is excessive flames caused by grease, fat drippings or the like dropping from the food onto the bed of hot coals which will accumulate until ignited which results in a flame flare-up or flash which may burn the food products and endanger the person using the grill.

SUMMARY OF THE INVENTION

An object of the present invention is to provide a barbecue grill with fire retarding screen in which the screen is supported in vertically spaced relation to the cooking grill on which the food products being cooked are supported with the fire retarding screen providing greater heat intensity to cook the food faster and cause grease and fat drippings to immediately dissipate upon contact with the screen thereby eliminating accumulation or build up of grease or fat drippings which can result in objectionable flames being formed when accumulated grease or fat drippings on the charcoal bed ignites such as when a kettle lid is lifted.

Another object of the invention is to provide a fire retarding screen located in vertically spaced relation above the bed of hot coals being used for cooking and below the grill supporting the food being cooked to retard upward movement of flames from the bed of coals toward the food being cooked due to the small mesh construction of the woven wire forming the fire retarding screen.

A further object of the invention is to provide a fire retarding screen in accordance with the preceding objects which is constructed of stainless steel or carbon steel coated with chrome with the metal wire forming the screen being approximately 1/16 inch in diameter and woven in perpendicular relation to achieve approximately ⅛ inch square openings through the screen with this type of screen being preferably supported approximately 1½ to 2 inches above the bed of coals and approximately 3 inches below the cooking grill.

Still another object of the invention is to provide a fire retarding screen in accordance with the preceding objects in which the screen is supported in suspended relation from the grill by a plurality of hook-type clips which enables the grill and fire retarding screen to be removed as a unit to facilitate cleaning when it becomes necessary and to enable the screen to be removed with the grill to add more charcoal if needed.

A still further object of the invention is to provide a barbecue grill with fire retarding screen which is simple in construction, easy to incorporate into various types of barbecue grill assemblies, relatively inexpensive to manufacture, long lasting, safe in operation and effective to provide optimum cooking conditions for various food products being cooked on the cooking grill.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a barbecue grill with portions of the kettle broken away illustrating the orientation of the fire retarding screen in relation to the cooking grill and charcoal supporting grill in the bottom of the kettle.

FIG. 2 is an exploded group perspective view of the barbecue grill and fire retarding screen illustrating the relationship of the components.

FIG. 3 is a fragmental perspective view illustrating the structure of the supporting hook-type clip for supporting the fire retarding screen from the cooking grill.

FIG. 4 is a fragmental perspective view of the retarding screen and supporting clip.

FIG. 5 is a fragmental perspective view similar to FIG. 4 but illustrating the supporting clip folded downwardly against the fire retarding screen.

DESCRIPTION OF THE PREFERRED EMBODIMENT

Referring now specifically to the drawings, the barbecue grill is generally designated by numeral 10 and the fire retarding screen combined therewith and forming the present invention is generally designated by the numeral 12. The grill 10 illustrated is of a conventional kettle type but it is pointed out that the present invention may be used with other types of grills which includes a cooking grill 14 which is supported in spaced relation to a bed of coals which, in this instance is supported on a charcoal supporting grill 16 which is supported adjacent the bottom of a kettle or pit 18. The interior of the kettle 18 includes conventional brackets 17 welded thereon or cast integral therewith with an inwardly extending ledge 19 at the upper and lower ends thereof to support the grills 14 and 16. The kettle 18 includes a plurality of supporting legs 20 or the like and a draft control 22 in the bottom thereof. The open top 24 of the kettle 18 is provided with a cover or lid 26 having a handle 28 thereon and an outlet vent control 30. Also, the kettle 18 is provided with handles 32 on the opposite sides and adjacent the top thereof. The structure of the grill 10 including the kettle 18, the cooking grill 14, the charcoal supporting grill 16, the brackets 17, the ledges 19 and the cover or lid 26 are conventional and well known components with the present invention including the combination of the fire regarding screen 12 therewith and supporting hook-type clips generally designated by numeral 34 which supports the fire retarding screen 12 in suspended relation below the cooking grill 14 as illustrated in several Figures of the drawings.

As illustrated, the cooking grill 14 includes a heavy peripheral rod 36 with a plurality of parallel, equally spaced supporting rods 38 secured thereto as by welding with a central diametric rod 40 underlying the supporting rods 38 and having the ends rigidly affixed to the peripheral rod 36 as by welding or the like. Also, the cooking grill 14 may be provided with upstanding handles 42 fixed thereto in a conventional manner to enable the grill to be lifted out of the kettle 18 from engagement with its supporting ledges 19 in the interior of the kettle 18. The charcoal supporting grill 16 may be of similar construction to the cooking grill except that it is smaller in diameter and is supported from the kettle 18 adjacent the lower end thereof but above the draft control 22 by the ledges 19 at the bottom ends of the brackets 17.

The fire retarding screen 12 includes a plurality of metal wires 44 and 46 which are woven in perpendicular relation to each other with the wires 44 and 46 being rigidly connected to each other and a peripheral rod 48 to provide a stable circular screen. The metal wires 44 and 46 are preferably 1/16 inch in diameter and constructed of stainless steel or carbon steel with a chrome coating with the openings or passages defined by the intersecting metal wires 44 and 46 which are designated by numeral 50 being substantially ⅛ inch square. The peripheral rod 48 is slightly larger in diameter and is also constructed of the same material as the perpendicularly woven wires 44 and 46.

Each of the hook-type clips 34 is in the form of a wire shank 52 having a reversely bent hook 54 on one end thereof and a laterally offset loop 56 formed on the other end thereof so that the clips 34 are free to move vertically and can fold down against the cooking grill 14. The loop 56 is perpendicular to the wire shank 52 and is disposed in underlying and supporting relation to the wires 44 or 46 so that the clips 34 are connected with the fire retarding screen 12 with the clips being capable of being folded downwardly into a folded position against the fire retarding screen as illustrated in FIG. 5 or oriented in a vertical perpendicular relation as illustrated in FIGS. 3 and 4 with the hook 54 being engaged with the wires or rods 38, 40 forming the cooking grill 14 as illustrated in FIG. 3. Five of the clips 34 are used with the clips being equally spaced peripherally of the fire retarding screen and with one of the clips being at the center of the screen thereby providing secure support of the screen 12 in suspended relation below the cooking grill 14 so that when the cooking grill 14 is removed, the fire retarding screen 12 will also be removed. This enables charcoal to be added to the bed of coals on the charcoal supporting grill 16 or positioned wherever a bed of coals is provided depending upon the type of grill which the fire retarding screen of the present invention is associated with. Likewise, the connection of the fire retarding screen to the grill 14 enables the fire retarding screen 12 to be lifted out of the kettle or pit 18 for cleaning when necessary. The foldability of the clips 34 and their detachable hooking engagement with the cooking grill 14 enables the fire retarding screen to be packaged, transported and stored in compact condition so that a purchaser may purchase the fire retarding screen and retrofit it to an existing barbecue grill and also enable the fire retarding screen to be packaged with the other components of a barbecue grill when it is initially sold to a user.

While the fire retarding screen 12 has been illustrated in association with a charcoal burning barbecue unit, it is pointed out that the screen may also be effectively used with gas grills which have similar problems of flame flare-up due to grease and fat drippings being ignited by the gas burner located below the cooking grill.

Regardless of what type of grill the fire retarding screen is used with, it will provide greater heat intensity by virtue of its being heated to a high temperature by the bed of coals, gas flame or the like. This high intensity heat will cook the food on the grill faster and will quickly and rapidly dissipate any fat or grease drippings from the food with the immediate dissipation being total evaporation or vaporization of the grease or fat drippings or actual ignition thereof which will not result in a large flame flare-up inasmuch as the immediate ignition of the fat or grease drippings as they drip onto the fire retarding screen will not produce a large flame but only a relatively small flame which will not be harmful to the food or dangerous to the user. The connection of the hook-type clips assures that they will be available for use whenever the fire retarding screen is to be used and enables the fire retarding screen to be stored, packaged and transported in compact condition.

When a charcoal or gas grill is used, especially of the kettle type as illustrated, the presence of the cover or lid frequently results in grease or fat drippings accumulating in the lower portion of the kettle so that when the kettle lid or cover is lifted during the normal course of cooking various food products on the grill, a resultant flare-up of flame occurs which frequently results in burning or charring the food products, especially meat products and also subjects the user to the danger of being burned by the flare-up of flame. Use of the fire retarding screen of this invention prevents or reduces the possibility of such flare-ups of flame occurring thus providing optimum cooking conditions for the food products and safe operation of the grill by the user.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a barbecue grill which includes a food product cooking grill supported in generally a horizontal plane for supporting food articles to be cooked thereon and a fuel burning assembly located below the cooking grill for cooking the food products on the grill, the improvement comprising a fire retarding screen, and means supporting the fire retarding screen in spaced parallel relation below the cooking grill and above the fuel burning assembly to retard flare up of flame from grease or fat drippings dropping onto and accumulating in the fuel burning assembly and subject to flame flare-up when supplied with oxygen resulting in charring of the food products and danger to the user of the grill, said fire retarding screen including metal wire members woven into a mesh with small passageways to retard flame passing upwardly therethrough with the passageways being of a size to retard any flame passing therethrough, said fuel burning assembly producing high heat intensity in the retarding screen for immediately dissipating grease and/or fat drippings dripping thereon, said means supporting the fire retarding screen including a plurality of hook-shaped clips, means movably connecting the hook-shaped clips to the fire retarding screen to enable the clips to move to a position against the fire retarding screen to be packaged, stored and transported in a compact condition, said clips including hooks on the free ends thereof for detachable hooking engagement with the food grill to support the fire retarding screen suspended below the grill with the fire retarding screen and clips being removable with the cooking grill to enable access to the fuel burning assembly without separation of the fire retarding screen from the cooking grill.

2. The structure as defined in claim 1 wherein said fire retarding screen is constructed of wire members having a diameter of approximately 1/16 inch with the wire members being woven in perpendicular relation to form openings of approximately ⅛ inch square, said wire members being constructed of heat resistant metal selected from the group including carbon steel coated with chrome or stainless steel, said hook-type clips supporting the fire retarding screen approximately 1½ to 2 includes below the cooking grill.

3. The structure as defined in claim 1 wherein the fuel burning assembly includes a charcoal supporting grill supported in the bottom of a kettle-type barbecue grill with simultaneous removal of the cooking grill and fire retarding screen enabling additional charcoal to be added to the charcoal supporting grill when necessary.

4. The structure as defined in claim 1 wherein said means movably connecting the clips to the fire retarding screen includes each clip including an elongated wire shank extending through one of the small openings in the fire retarding screen, said hook on the free end of the clip including a reversely bent hook at the upper end of the shank when the shank extends vertically from the fire retarding screen, and a laterally offset loop on the lower end of the shank with the loop being incapable of passing through the small openings and oriented in underlying relation to the fire retarding screen and supportingly engaging the under surface of the fire retarding screen when the shank is vertically oriented, said loop being unattached with respect to the fire retarding screen to enable vertical movement of the shank through the small openings but precluding detachment of the clip from the fire retarding screen and enabling the shank and hook to be positioned against the upper surface of the fire retarding screen when the fire retarding screen is separated from the cooking grill, said fuel burning assembly including a charcoal supporting structure for supporting charcoal in vertically spaced relation below the fire retarding screen with the clips forming the sole support of the fire retarding screen in suspended and supported relation to the cooking grill so that removal of the cooking grill also removes the fire retarding screen to enable replenishment of charcoal by simultaneously lifting the cooking grill and the fire retarding screen suspended therefrom while additional charcoal is added and then simultaneously returning the fire retarding screen and cooking grill to their supported position.

* * * * *